United States Patent [19]

Ellefson

[11] Patent Number: 4,632,414
[45] Date of Patent: Dec. 30, 1986

[54] LAND VEHICLE PROPELLED BY SIMULATED ROWING MOTION

[76] Inventor: Mark W. Ellefson, 1545 Bluff Creek Dr., Chaska, Minn. 55318

[21] Appl. No.: 623,511

[22] Filed: Jun. 22, 1984

[51] Int. Cl.$^4$ ............................................. B62M 1/14
[52] U.S. Cl. .................................... 280/246; 280/220; 280/255; 280/265; 280/281 LP
[58] Field of Search .................. 280/220, 225, 242 R, 280/244, 246, 248, 252, 281 LP, 255, 263, 265, 226 R

[56] References Cited

U.S. PATENT DOCUMENTS 4,373,740  2/1983  Hendrix ........................ 280/281 LP

FOREIGN PATENT DOCUMENTS

| 130783 | 1/1949 | Australia | 280/255 |
| 2458110 | 7/1976 | Fed. Rep. of Germany | 280/244 |
| 2913503 | 10/1979 | Fed. Rep. of Germany | 280/244 |
| 545427 | 10/1922 | France | 280/242 R |
| 606051 | 6/1926 | France | 280/242 R |
| 612851 | 11/1926 | France | 280/242 R |
| 666011 | 9/1929 | France | 280/242 R |
| 71715 | 8/1944 | Norway | 280/242 R |

Primary Examiner—John J. Love
Assistant Examiner—Charles R. Watts
Attorney, Agent, or Firm—Malcolm Reid

[57] ABSTRACT

A wheeled land vehicle propelled by a rowing or sculling motion of a rowing member pivotally extending from the frame thereof which is in operative connection with the rear drive wheel. Front wheels are journalled from each side of the frame and are steeringly connected to each other and operatively connected to foot pedals mounted on the frame.

7 Claims, 4 Drawing Figures

LAND VEHICLE PROPELLED BY SIMULATED ROWING MOTION

TECHNICAL FIELD

A land vehicle propelled by a single person through a rowing motion which simulates that used during rowing or sculling.

BACKGROUND ART

Rowing has long been one of the best forms of exercise. This is because rowing has been taught to condition all major and most minor muscle groups of the body. In addition, more calories are burned during rowing than many other exercises, such as running. Rowing has also been taught to provide excellent cardiovascular fitness.

There have been disclosed stationary devices which were supposedly designed to simulate rowing. In addition, various forms of vehicles designed for propulsion by an occupant thereof by a reciprocating or oscillating movement of a drive actuator have been disclosed. However, there has been minor development of a land vehicle having a drive system which can be operated in the manner of simulating conventional oars or those utilized in competitive sculling.

U.S. Pat. No. 4,126,329 discloses a wheeled land vehicle having oar-type propulsion. That unit is propelled by actuation of the front wheels thereof by the simulated oars, and steering of the vehicle is disclosed very sparingly. The only specific disclosure relative to the steering thereof is directed to somehow steering the rear wheel thereof or adjusting the rowing movement, i.e., a torque, to each wheel.

In contrast thereto, my invention allows for a rowing or sculling motion to drive the rear wheel thereof, which reduces the power requirement, can utilize conventional bicycling equipment, and has a simple steering mechanism designed to allow the feet to steer the front wheels.

SUMMARY OF THE INVENTION

In accordance with the invention there is provided a wheeled vehicle with an oar-type drive assembly capable of simulating rowing or sculling, comprising a main frame having front wheels journaled from each side thereof, the front wheels being steeringly connected to each other and operatively connected to foot pedals mounted on the frame; a drive wheel journaled from the rear portion of the main frame; and a rowing member pivotally attached to the frame with oar handles extending outwardly from the outboard end thereof, the rowing member being operatively connected to the drive wheel to effect a foward rotation thereof.

DESCRIPTION OF THE PREFERRED EMBODIMENT

Figures 1, 2:
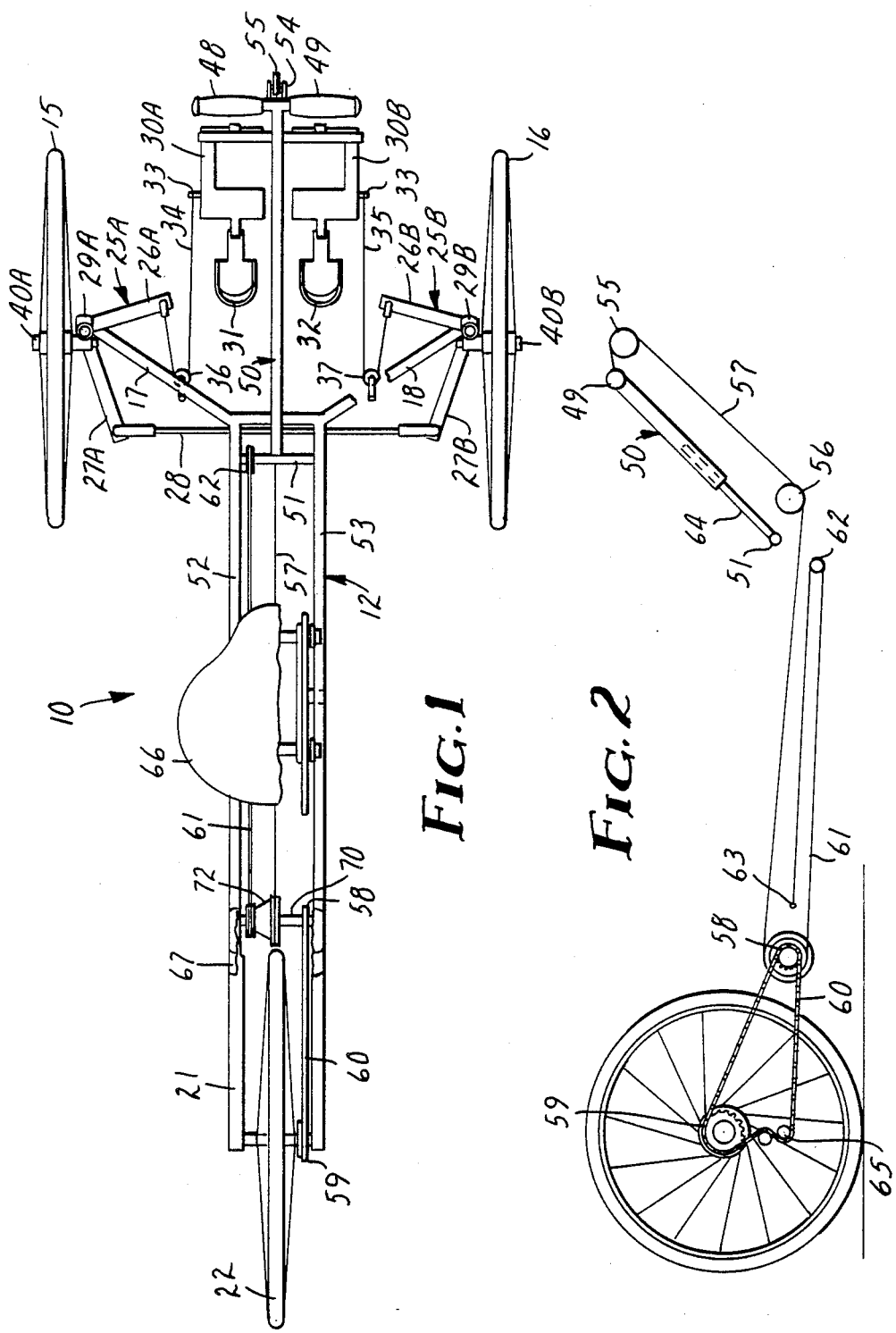
FIG. 1 is a top view of my land vehicle with a cutout of the seat thereof.
FIG. 2 is a side view illustrating the drive train of my invention.
Figure 3:
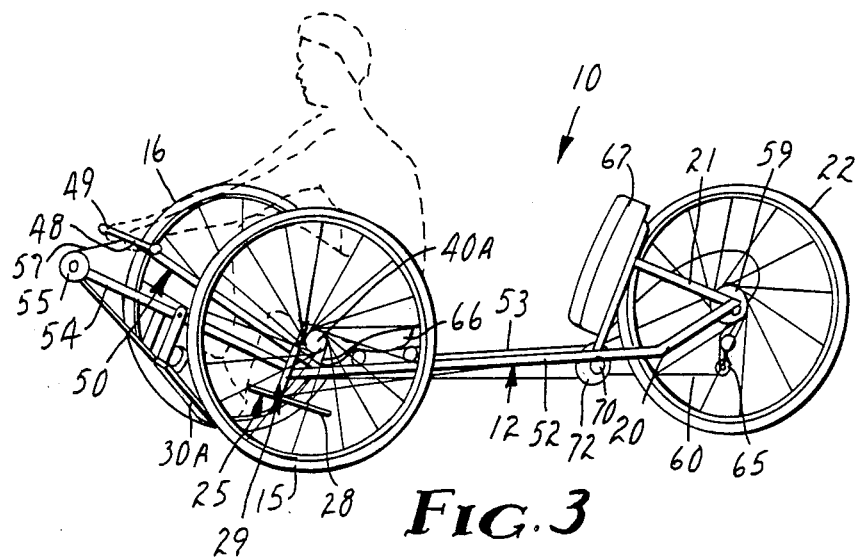
FIGS. 3 and 4 are perspective views of the vehicle in operation, with FIG. 3 illustrating the beginning position of the power drive or rowing stroke and FIG. 4 illustrating the partially completed power drive or rowing stroke position.
Figure 4:
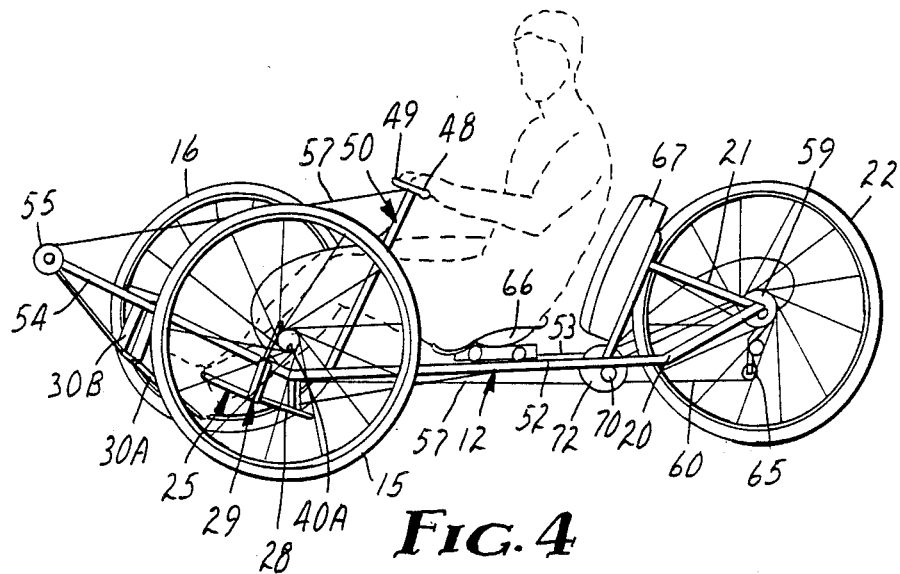

Referring now more specifically to the drawings and to FIGS. 1 through 4 in particular, the numeral 10 generally designates the vehicle of the instant invention.

The vehicle 10 includes a low longitudinally extending main frame 12 having a pair of opposite side front wheels 15 and 16 attached to the forward end portion thereof by longitudinally extending members 17 and 18. The rear end portion of the main frame includes an upwardly inclined and rearwardly directed section 20 whose ends provide a fork-type assembly 21 which extends therefrom, wherein a rear wheel 22 is journaled.

Each of the front wheels 15 and 16 is connected to a steering assembly 25A and B, each assembly comprising steering arm 26A and B, tie rod arm 27A and B, with both arms being connected to tie rod 28, and a bearing spindle assembly 29A and B for attachment of the main frame 12 and steering assembly 25A and B to each wheel 15 and 16. Left and right foot pedals 30A and B are provided for insertion of the feet thereinto and same may contain items like heel supports 31 and 32 and conventional bicycle toe clips (not illustrated). Each of the pedals 30A and B are pivotally attached to the main frame, and have cables 34 and 35 fixedly attached thereto, as at 33, such that movement downward of one of the pedals by the foot of the operator will cause movement of cables 34 and 35. Cables 34 and 35 are attached around pulleys 36 and 37 fixedly to steering arms 25A and B on each side of main frame 12. Depression, for example, of left foot pedal 30A causes a clockwise movement of steering arm 25A via cable 34 and tie rod arm 27A, and the spindle assembly 29A attached to left wheel 15, causing same to turn in a clockwise direction. Because tie rod arm 27A is attached to tie rod 28 and thus right wheel tie rod arm 27B, the same movement is effected in right wheel 16. In this manner, both wheels function, as far as steering, by the depression of a single foot pedal. Depression of right pedal 30B causes the opposite reaction and both front wheels 15 and 16 will turn in a counterclockwise direction.

Spindle assemblies 29A and B are similar to those found on steering assemblies of standard bicycles. Inside spindle assemblies 29A and B are contained threaded tubes (not shown) which are fixedly attached to steering arm 26A and B and tie rod arm 27A and B of the pivoting steering assembly. A bearing assembly at the top of the threaded tube allows for free rotation of the wheel about the spindle axis. At the base of the threaded tube is a member which is bolted thereto to thus fix the rotation of the spindle assemblies 29A and B in accordance with the movement of the steering arm. Wheels 15 and 16 are fixedly mounted to spindle assemblies 29A and B through the use of axle bolts 40A and B which are attached directly thereto. Through the use of this type of steering mechanism, the profile of main frame 12 can be maintained at a lower axis than that of the axle 40A and B of the front wheels 15 and 16. This low profile allows for excellent turning stability, even while braking.

Attached to the ends of each steering cable 34 and 35 near points 33 on foot pedals 30A and B are springs or elastic members, not shown, to allow steering cables 34 and 35 to maintain a taut position at all times.

The drive assembly of my invention as illustrated generally in FIG. 2, contains rowing member 50, a tubular shaft pivotally extending upwardly from main frame 12, preferably via crossbar 51 which is pivotally attached to main frame members 52 and 53, the pivotal attachment being via bearing assemblies (not shown). Extending outwardly from the outboard end of rowing member 50 are two oar handles 48 and 49 for gripping thereof by the individual operating the vehicle. Handles 48 and 49 can be conventional bicycle grips if desired. Extending frontwardly and inclined upward from main frame 12 is tubular member 54 which is sheaved at its outward end 55. There is similarly a sheaved member or pulley 56 attached to the underside of main frame 12 around which drive cable 57 is maintained.

At the rear of main frame 12 is attached jack shaft 70 containing thereon one-way ratcheting sprocket 58, the teeth thereof being in alignment with those of drive sprocket 59 of rear wheel 22. A chain 60 drivedly attaches sprocket 59 of rear wheel 22 with one-way ratcheting sprocket 58. Jack shaft 70 also contains thereon flanged drum 72. Drive cable 57 is wrapped around the surface of flanged drum 72 and is fixedly attached thereto. Drive cable 57 is traversed from flanged drum 72 around sheaved members 55 and 56 and fixedly attached to tubular member 50, thus putting handles 48 and 49 on member 50 in driveable relationship with flanged drum 72. As the person operating my invention pulls the oar handles toward his body, drive cable 57, by being pulled around the circumference of flanged drum 72, causes rotation of jack shaft 70, which in turn causes rotation of one-way ratcheting sprocket 58. This rotation is transmitted via drive chain 60 to rear wheel 22, thus causing the vehicle to move forward.

Flanged drum 72 also contains a smaller groove around which can be placed an elastic member 61, the placement thereof being in the direction opposite to drive cable 57. Elastic member 61 is traversed around a sheaved member or pulley 62 attached to main frame 12 and is fixedly mounted to main frame 12 (shown at 63). Elastic member 61 thus provides a spring rewind effect which rewinds cable 57 on flanged drum 72 during the return stroke of rowing member 50.

Preferably, rowing member 50 is comprised of a telescoping tubular member 50 in sliding engagement with telescoping tubular member 64 which is attached to main frame 12 as noted above. This telescoping action allows the vehicle user to row with an essentially linear motion while restricting movement to a vertical plane. The rider thus gets greater stability than available than if rowing member 50 was unitary and simply fastened to drive cable 57 with no directional guidance arrangement. Furthermore, this preferred embodiment also simulates actual rowing motion much better than if the handles could only travel in an arc about a pivot point.

While unnecessary for operation of my invention, sprocket assembly 59 can be, for example, a 5-member ratchet assembly to allow speed control in conjunction with a conventional bicycle derailleur 65. A conventional bicycle shift lever (not shown) can be attached to rowing member 50 in communication with rear wheel 22 so as to allow for speed changes. In addition, a conventional caliper brake control (not shown) can also be attached to rowing member 50 and be placed in communication with a caliper brake (not shown) conventionally attached to fork-type assembly 21 and function in a manner similar to conventional bicycle caliper brakes. The brake lever also can have a position whereby the brake can be locked to insure that the brake is applied with the vehicle is left unattended.

The pair of opposite main frame longitudinal members 52 and 53 support seat 66 thereon, seat 66 being in horizontally movable, e.g., sliding or rolling engagement therewith, as shown in FIG. 1. Accordingly, the seat can be horizontally moved e.g., rolled or slid back and forth longitudinally. This allows the use of the legs while operating the vehicle of the invention. At the beginning of the power stroke, FIG. 3, the operator reaches straight forward with the arms while rolling or sliding forward on seat 66. This brings the knees of the person close to the chest and maintains the back straight. As the power stroke is begun, the legs are extended, while the arms are maintained straight. As the legs become straight, the arms pull rowing member 50 via oar handles 48 and 49 to the chest as the hips, and not the waist, pivot the upper body backward. Throughout the power stroke, torque is applied to rear wheel 22, thus driving the vehicle forward. While oar handles 48 and 49 are returned to the front position, the vehicle is allowed to coast.

Back rest 67 is typically used only if the operator desires to rest while the vehicle is coasting.

It is anticipated that the vehicle can be also utilized during the sessions when outdoor activity is curtailed, such as during inclement weather. A simple stand can be utilized to elevate rear wheel 22 from the ground, thus allowing the vehicle to be operated in a stationery fashion.

What is claimed is:

1. A wheeled vehicle with an oar-type drive assembly capable of simulating a rowing motion, comprising:
    (a) a main frame having front wheels journaled from each side thereof, said front wheels being steeringly connected to each other, the steering thereof being operative by foot pedals mounted on said frame, each of said foot pedals being pivotally attached to said main frame and having attached to each of said foot pedals a cable in operative connection with separate steering arms, each of said steering arms being separately fixedly attached to a rotatable spindle assembly attached to each of said front wheels and to separate tie rod arms, each of said tie rod arms being attached to a common tie rod therebetween, whereby movement of one of said foot pedals causes equal reaction to each of said front wheels;
    (b) a drive wheel journaled from the rearward portion of said frame;
    (c) a rowing member pivotally attached to said frame at one end of said member and having oar handles extending outwardly from the opposite end of said member, said rowing member being operatively connected to said drive wheel to effect the rotation thereof in a forward direction;
    wherein said rowing member is attached by cable to a flanged drum having said cable wound thereon, said flanged drum being mounted on a jack shaft attached to said main frame; a one-way ratchet mechanism operatively connecting said drum and said drive wheel, said rowing member being capable of pulling said cable to effect rotation of said drum and drive wheel in a forward direction, and means for returning said drum and said cable to their original position;
    wherein said means for returning said drum and said cable to their original positions includes an elastic member wound on said drum in a direction opposite to the direction in which said cable in wound on said drum, one end of said elastic member being operatively attached to said main frame, whereby upon unwinding said cable from said flanged drum by a pulling action of said rowing member, said elastic member is correspondingly wound upon said flanged drum, thereby increasing tension in said elastic member such that when said pulling action of said rowing member ceases, said elastic member seeks to release tension therein, thereby causing said cable to rewind on said flanged drum as said rowing member is returned to its original position.

2. The vehicle of claim 1 wherein said rowing member comprises a shaft journaled between two sides of said main frame and having fixedly attached to said shaft and extending radially outward therefrom a tubular member having oar handles extending from the outboard end thereof.

3. The vehicle of claim 1 wherein said rowing member comprises a shaft journaled between two sides of said main frame and having fixedly attached to said shaft and extending radially outward therefrom a first tubular member, and a second tubular member slidably disposed over said first tubular member and having oar handles extending from the outboard end thereof.

4. The vehicle of claim 1 further containing braking means operative on said drive wheel and controllably connected to said rowing member.

5. The vehicle of claim 4 wherein said braking means comprise a caliper brake operable on said drive wheel and controllably connected to said rowing member.

6. The vehicle of claim 1 wherein said drive wheel contains ratchets of different diameter and a derailleur operative therewith to allow speed changes of the vehicle, said derailleur being operably connected with and controllable from said rowing member.

7. The vehicle of claim 1 further containing seat means horizontally movably attached to said main frame.

* * * * *